US006238072B1

(12) United States Patent
Eto

(10) Patent No.: US 6,238,072 B1
(45) Date of Patent: May 29, 2001

(54) VEHICLE LAMP

(75) Inventor: Toyozo Eto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/253,452

(22) Filed: Feb. 19, 1999

(30) Foreign Application Priority Data

Feb. 20, 1998 (JP) ........................................ 10-038466

(51) Int. Cl.[7] ........................ B60Q 1/00; F21V 11/00

(52) U.S. Cl. ...................... 362/539; 362/303; 362/305; 362/509; 362/294; 362/547; 362/345; 362/351; 362/353; 362/361

(58) Field of Search ............................ 362/539, 300, 362/303, 305, 509, 547, 294, 345, 351, 353, 361

(56) References Cited

U.S. PATENT DOCUMENTS

| | | | |
|---|---|---|---|
| 5,067,054 | 11/1991 | Oshio et al. . | |
| 5,195,815 | 3/1993 | Watanabe et al. . | |
| 5,430,623 | 7/1995 | Uchida . | |
| 5,567,033 | 10/1996 | Tanaka et al. . | |
| 5,782,550 * | 7/1998 | Ohashi et al. | 362/61 |
| 5,971,575 * | 10/1999 | Matubara | 362/510 |

* cited by examiner

*Primary Examiner*—Thomas M. Sember
*Assistant Examiner*—Ali Alavi
(74) *Attorney, Agent, or Firm*—Koda & Androlia

(57) ABSTRACT

A vehicle headlamp having a clear front lens, a light bulb and a shade that covers a forward portion of the light bulb. The shade is provided with a radiation opening and a shading portion; and the shading portion is formed so as to prevent the light rays emitted from the light bulb from radiating to the front of the light bulb through the radiation opening, thus preventing a glare light and decreasing the temperature of an area around the light bulb.

6 Claims, 4 Drawing Sheets

VEHICLE LAMP

BACKGROUND OF THE INVENTION

1. Field of the Invention

The present invention relates to a vehicle lamp and more particularly to a vehicle lamp that has a shade which covers a light source for preventing the generation of dazzling light rays.

2. Prior Art

It is well known that a vehicle lamp includes an element that is called a shade. The shade covers at least the front end portion of a light source so as to prevent light rays emitted from the light source from becoming dazzling light rays which is generally called a “glare light”.

In the above vehicle lamp, however, heat generated by the light source is likely to accumulate within the shade without escaping, which increases the temperature of the area around the light source.

When the temperature of the area around the light source increases, various problems occur. For example, exfoliation of the plating applied to the shade occurs, thus darkening the shade, and the life of the light source is shortened. The heat accumulated inside the shade is also likely to damage a leg portion of the shade which supports the shade to a reflector or a lamp body. So as to avoid this, the leg portion may be provided on the side surface of the shade; however, with this structure, the light rays emitted from the light source and laterally directed will be blocked by the leg portion, resulting in that the quantity of light becomes insufficient.

If the shade is designed so as to cover only the front portion of the light source in order to avoid the heat generated by the light source from accumulating in the shade, the light rays emitted in the lateral and downward directions are reflected by the side surface and lower surface of the reflector, respectively. If this occurs, a pedestrian may be dazzled by the glare of the light laterally emitted from the lamp of the approaching vehicle. The driver of a vehicle may also be dazzled by the glare of the light emitted upward from the lamp of the approaching vehicle if the approaching vehicle has the shade described above. In case of driving in the rain, such a dazzling light may result in optical film phenomenon in the front of the vehicle.

SUMMARY OF THE INVENTION

Accordingly, the object of the present invention is to provide a vehicle lamp that can prevent the generation of a glare light and decrease the temperature around the light source of the vehicle lamp that has a shade covering the light source.

In order to accomplish the object, in the vehicle lamp of the present invention, the shade is provided with a radiation opening(s) and a shading portion(s) which is formed so as to prevent the light ray emitted from the light source from radiating to the front of the light source through the radiation opening(s).

Accordingly, the vehicle lamp of the present invention can decrease the temperature around the light source by way of preventing the heat generated by the light emitted from accumulating inside the shade and also can block the light rays from radiating to the front of the light source, thus eliminating glare light.

DETAILED DESCRIPTION OF THE PREFERRED EMBODIMENTS

Figure 1:
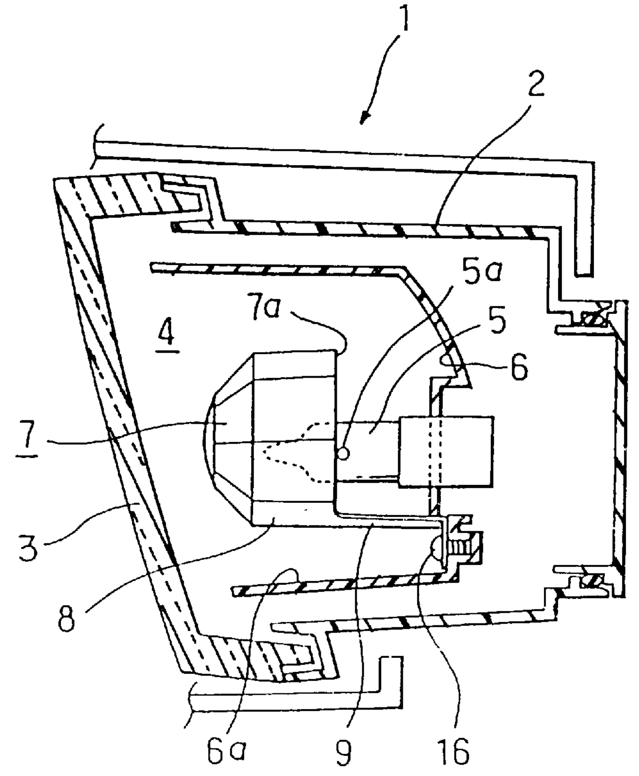
FIG. 1 is a vertical sectional view of a first embodiment of the vehicle headlamp according to the present invention.
Figure 2:
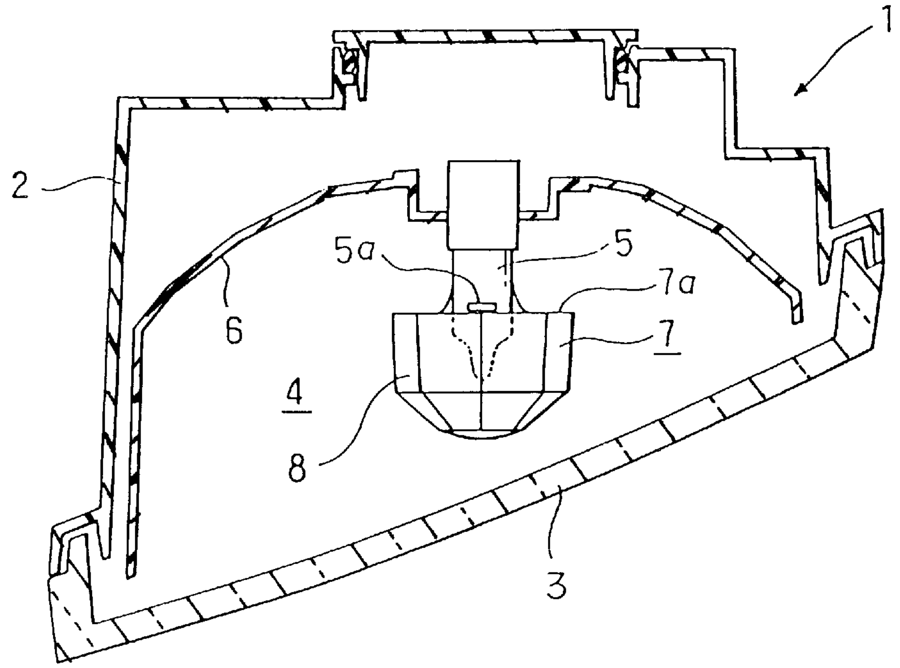
FIG. 2 is a horizontal sectional view thereof.

Embodiments of the vehicle lamp according to the present invention will be described below with reference to the accompanying drawings. Each embodiment will be described about a headlamp used in an automobile.

FIGS. 1 to 5 illustrate a first embodiment of the present invention.

The vehicle headlamp 1 comprises a lamp body 2 with a recess portion open to the front thereof, a front lens 3 which covers the front open end of the lamp body 2, and a reflector 6 which holds a light bulb 5 disposed in a light chamber 4 which is defined by the lamp body 2 and the front lens 3.

The front lens 3 is a clear lens provided having no lens-steps so that the inside of the light chamber 4 can be clearly seen through the front lens 3 from the front of the vehicle headlamp 1.

The light bulb 5 is provided so that the filament **5*a* thereof is disposed horizontally and perpendicular to the optical axis of the light bulb 5. In addition, a shade 7 is provided in front of the light bulb 5. The positional relationship between the filament 5*a* of the light bulb 5 and the shade 7** will be described later.

The shade 7 comprises a cap-like shade main body 8 and a leg 9 which are formed in an integral single body. The shade main body 8 of the shade 7 has a polygonal shape (an octagonal shape in the shown embodiment) when viewed from the front (left side in FIG. 1), and its rear end (right end in FIG. 1) is opened. The leg 9 of the shade 7 projects, as seen from FIG. 1, rearward from the rear bottom edge of the shade main body 8, and a fitting portion **9*a*** is formed at the rear end thereof.

The configuration of the shade main body 8 will be described below in detail.

Figure 5:
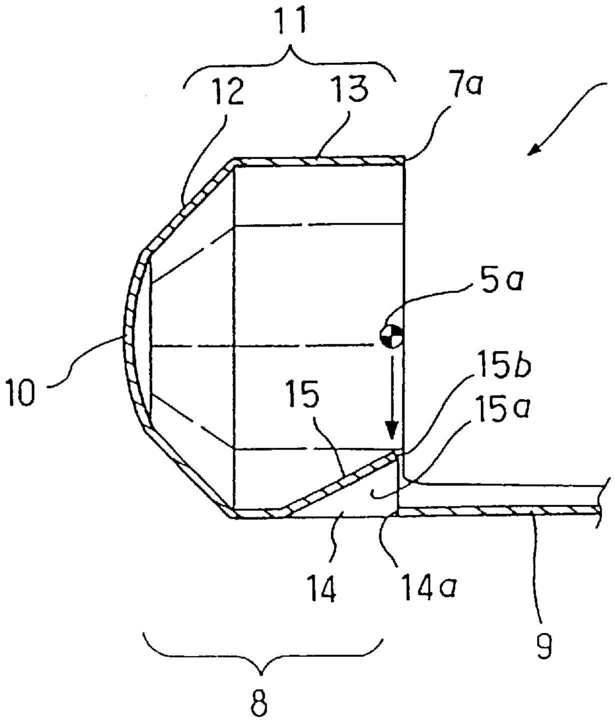
FIG. 5 is a longitudinally sectional side view thereof.

The shade main body 8 comprises, as best seen from FIG. 5, a front portion 10 and a peripheral wall portion 11. The front portion 10 has an annular shape when viewed form the front, and the surface thereof forms an arc slightly projecting forward. The peripheral wall portion 11 continuously extends rearward from the peripheral edge of the front portion 10 and includes a front end portion 12 and a cylindrical portion 13. The front end portion 12 has a shape in which the diameter thereof gradually widens rearward, and the cylindrical portion 13 is formed continuously from this front end portion 12. The cylindrical portion 13 has a diameter which is substantially unchanged for the entire length thereof.

The front end portion 12 has an octagonal cone shape defined by eight (8) frontal surfaces **12*a* through 12*h* which are 45 degrees apart from each other. More specifically, the front end portion 12 comprises: a top left (top right in FIG. 4) frontal surface 12***a* which is slanted so as to have an upward rear portion, an upper left (upper right in FIG. 4) frontal surface 12*b* which is continuous from the lower edge of the top left frontal surface 12*a* and slanted so as to have an upward left portion, a lower left (lower right in FIG. 4) frontal surface 12*c* continuous from the lower edge of the upper left frontal surface 12*b* and slanted so as to have a downward left portion, a bottom left (bottom right in FIG. 4) frontal surface 12*d* continuous from the lower edge of the lower left frontal surface 12*c* and slanted so as to have a downward rear portion, a bottom right (bottom left in FIG. 4) frontal surface 12*e* continuous from the lower edge of the bottom left frontal surface 12*d* and slanted so as to have a downward rear portion, a lower right (lower left in FIG. 4) frontal surface 12*f* continuous from the upper edge of the bottom right frontal surface 12*e* and slanted so as to have a downward right portion, an upper right (upper left in FIG. 4) frontal surface 12*g* continuous from the upper edge of the lower right frontal surface 12*f* and slanted so as to have an upward right portion, and a top right (top left in FIG. 4) frontal surface 12*h* continuous from the upper edge of the upper right frontal surface 12*g* and continuous to the top left frontal surface 12*a* and slanted so as to have an upward rear portion.

Furthermore, the cylindrical portion 13 has an octagonal cylindrical shape defined by eight (8) flat side surfaces 13*a* to 13*h* which are respectively formed continuously from the rear end edges of the corresponding frontal surfaces 12*a* through 12*h* of the front end portion 12. The eight (8) side surfaces 13*a* to 13*h* are continuous to each other at both side edges of the adjacent side surfaces.

Figure 3:
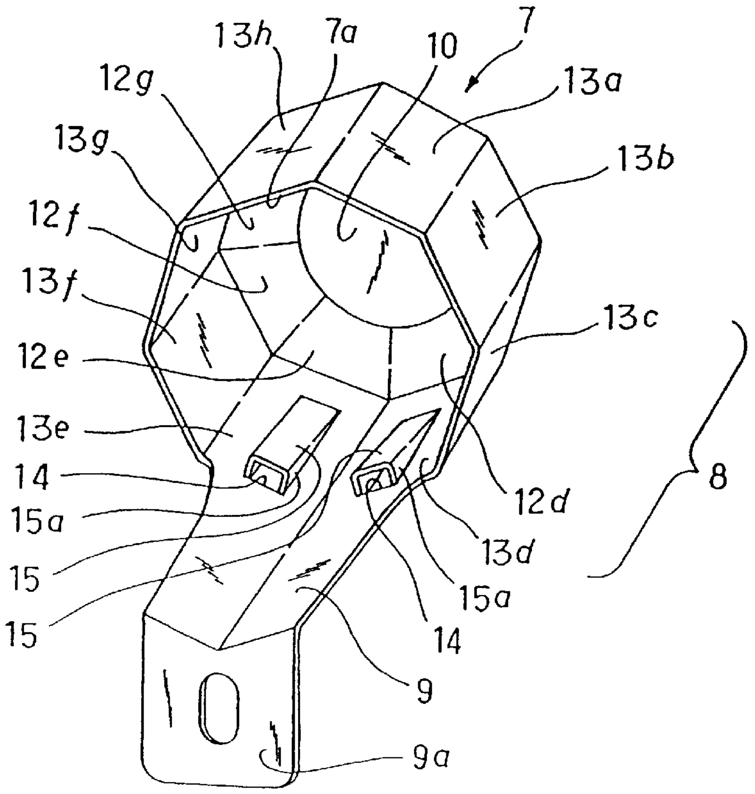
FIG. 3 is an enlarged perspective view substantially taken from the top and rear of the shade used in the headlamp of the first embodiment of the present invention.
Figure 4:
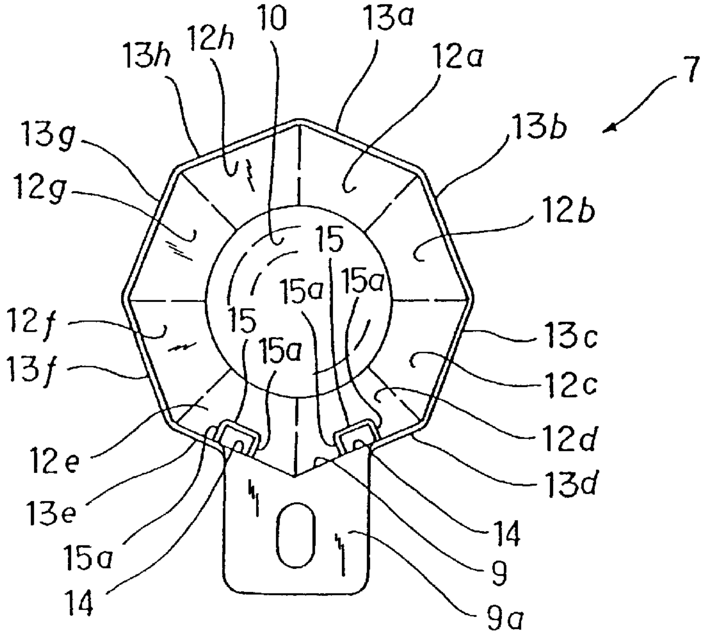
FIG. 4 is a rear elevational view thereof.

In addition, the leg 9 extends, as best seen from FIG. 3, rearward from the rear edges of two side surfaces 13*d* and 13*e* that constitute a lower section of the cylindrical portion 13. More specifically, the leg 9 is bent along the center line extending in the lengthwise direction thereof so that the leg 9 is bent at the same angle as the angle that is defined by the two side surfaces 13*d* and 13*e*. Thus, the leg 9 has high rigidity.

Furthermore, radiation openings 14 and shading portions 15 are respectively formed in the two lower side surfaces (more specifically, in the bottom left side surface 13*d* and in the bottom right side surface 13*e*) of the cylindrical portion 13.

More specifically, the radiation openings 14 are rectangular holes formed in the side surfaces 13*d* and 13*e*, respectively; and the shading portions 15 are formed by shading pieces each, as seen from FIG. 3, slanting upward from the front edge to the rear edge of the radiation openings 14 so as to cover the radiation openings 14 substantially entirely.

Both right and left side edges of each one of the shading portions 15 are connected to the right and left side edges of each one of the radiation openings 14 by connecting pieces 15*a* which are triangle when viewed from the side as shown in FIG. 5. The above-described shading portions (or shading pieces) 15 and triangular pieces 15*a* are integrally formed with the cylindrical portion 13 of the shade 7.

As seen from FIG. 5, the rear end edge 14*a* of each of the radiation openings 14 and the rear end edge 15*b* of the shading portion 15 are positioned at substantially the same location with respect to the axis direction of the cylindrical portion 13.

The shade 7 thus constructed is, as seen from FIG. 1, mounted to the reflector 6 by a screw 6 that is fitted to the fitting portion 9*a* of the leg 9 of the shade 7.

The shade 7 and the light bulb 5 are arranged so that the filament 5*a* of the light bulb 5, the rear end edges 14*a* of the radiation openings 14, and the rear end edges 15*b* of the shading portions 15 are positioned at substantially the same location with respect to the axis direction of the cylindrical portion 13 as seen from FIG. 5. More specifically, since the filament 5*a* has a certain thickness, the rear end thereof, the rear end edge 14*a* of the radiation opening 14, and the rear end edge 15*b* of the shading portion 15 are arranged so as to be on substantially the same diametric plane of the cylindrical portion 13 as seen from FIG. 5. With this arrangement, the light rays emitted downward from the light bulb 5 are prevented from being reflected by the inner surface of the lower portion 6*a* of the reflector 6. Thus, any upward radiation of the glare light is prevented.

If the filament 5*a* is located further back (or further right in FIG. 5) of the rear end edges 14*a* of the radiation openings 14 and the rear end edges 15*b* of the shading portions 15, the light rays will be emitted out of the shade 7 through the radiation openings 14. Therefore, it is preferable that the filament 5*a* is positioned on the front side (left side in FIG. 5) with respect to the rear end edges 14*a* of the radiation openings 14 and the rear end edges 15*b* of the shading portions 15. Incidentally, even if the rear end edges 14*a* of the radiation openings 14 and the rear end edges 15*b* of the shading portions 15 are located on the front side than the filament 5*a*, the light rays directed to the front (or to the left in FIG. 5) of the filament 5*a* will not become glare light as long as its quantity is substantially small.

In the vehicle headlamp 1 described above, since shade 7 is provided with the radiation openings 14, the heat generated by light emission of the light bulb 5 can promote air flow within the shade 7; as a result, the temperature in the area around the light bulb 5 is prevented from rising. Therefore, various problems that would result from the high temperature around the light bulb 5 can be solved.

If the heat generated by the light emission of the light bulb 5 is accumulated inside the shade 7, the heat may direct the air to flow rearward and upward from the upper portion of the open rear end 7*a* of the shade 7. Such flow causes the cool air in the lower section of the shade 7 to enter into the shade 7 through the radiation openings 14 located below the light bulb 5. This may further promote the heat to be released from the upper section of the open rear end 7*a*, thus preventing the accumulation of heat within the shade 7.

In addition, the radiation openings 14 are provided in the lower section of the shade 7. Accordingly, the radiation openings 14 are not visually identified even though the front lens 3 is a clear lens. Therefore, the outer appearance of the headlamp is not impaired. In other words, though the vehicle headlamp 1 is generally seen from a higher visual point, since the radiation openings 14 are formed in the lower section of the shade 7, they are hardly identifiable.

In this embodiment, the shading portions 15 are arranged so as to protrude inward of the shade 7 (or toward the center of the main part 13) so that the rear portions rise as seen from FIG. 5. However, the present invention is not limited to this arrangement. The shading portion(s) can be arranged so that the shading portion(s) is formed outside the cylindrical portion 13 and declines toward the front. Alternatively, the shading portion(s) can be arranged so that the shading portion(s) is formed outside the cylindrical portion 13 and declines toward the back. Furthermore, the shading portion(s) can also be arranged so that the shading portion(s) is formed inside the cylindrical portion 13 and declines toward the front.

Figure 6:
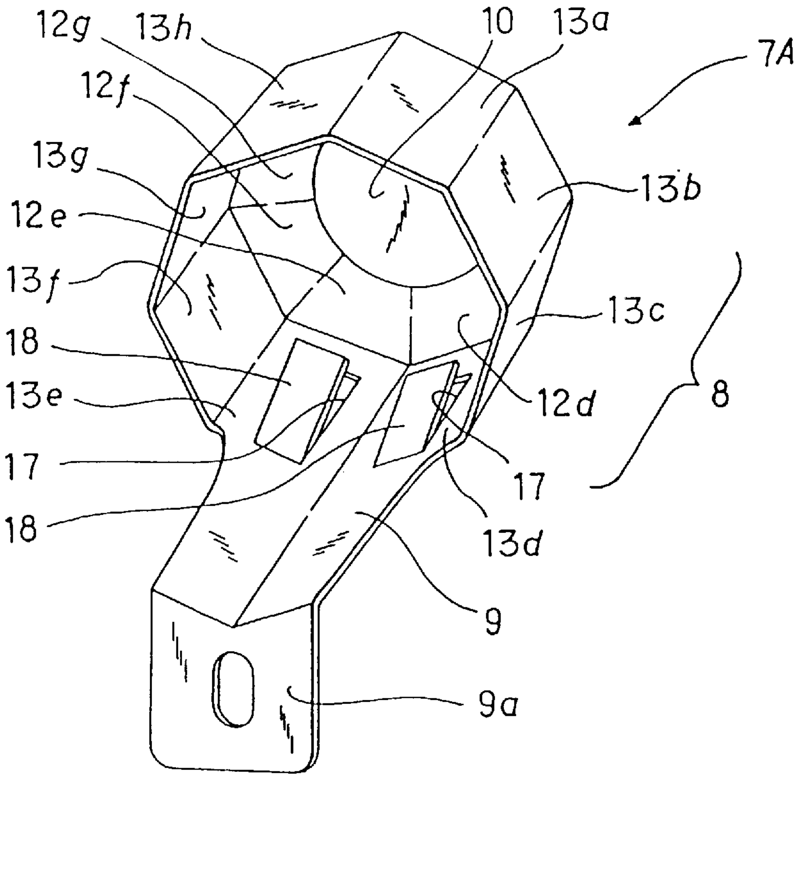
FIG. 6 is an enlarged perspective view substantially taken from the top and rear of the shade used in the headlamp of the second embodiment of the present invention.

FIG. 6 illustrates a second embodiment of the vehicle headlamp according to the present invention.

The second embodiment is different from the first embodiment only in configurations of the radiation openings 14 and the shading portions 15. Therefore, the description will be made only with reference to the different elements; and other elements designated by the same reference numerals as those of the corresponding elements of the vehicle lamp of the first embodiment will be omitted.

As seen from FIG. 6, radiation openings 17 and shading portions 18 are formed in two surfaces (in the bottom left side surface 13*d* and in the bottom right side surface 13*e*) in the lower section of the cylindrical portion 13 of the shade 7. These openings 17 and shading portions 18 are formed by pushing out the cuts made in areas of the side surfaces 13*d* and 13*e*.

More specifically, angled U-shape cuts each having an open front portion are made in the side surfaces 13*d* and 13*e*, and these cuts are pushed inward so as to form the radiation openings 17. The pushed pieces of the U-shape cuts form the shading portions 18.

The shading portions 18 of the this embodiment protrude inward of the shade 7A and have rising front portions in the same manner as the shading portions 15 of the first embodiment. This arrangement of the second embodiment may improve the heat releasing effect and prevent the generation of glare light. In addition, since the structure is simple, it can minimize the manufacturing cost.

Figure 7:
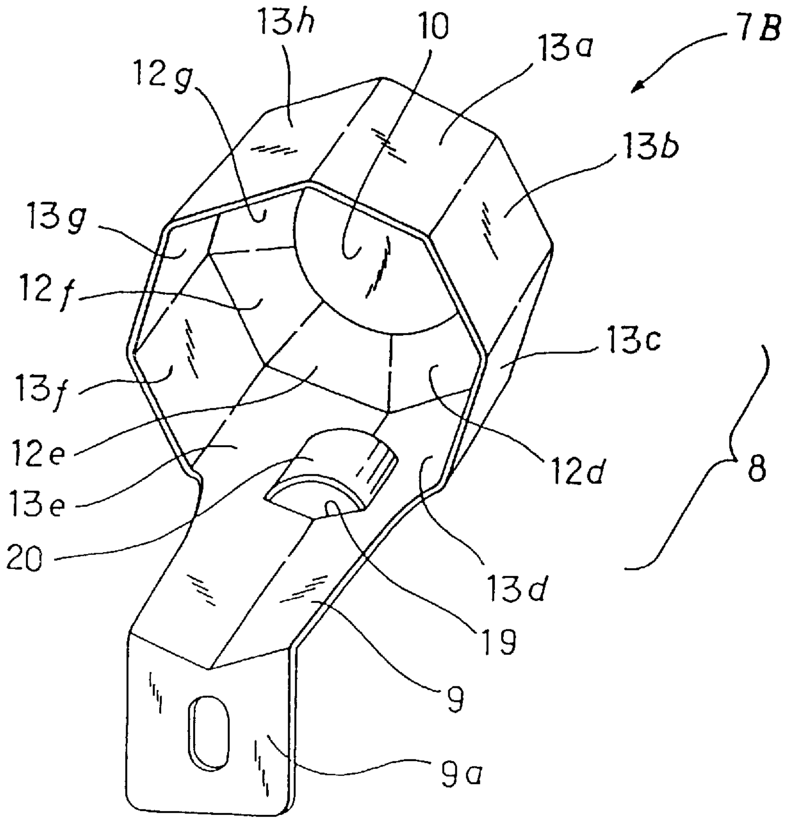
FIG. 7 is an enlarged perspective view substantially taken from the top and rear of the shade used in the headlamp of the third embodiment of the present invention.
Figure 8:
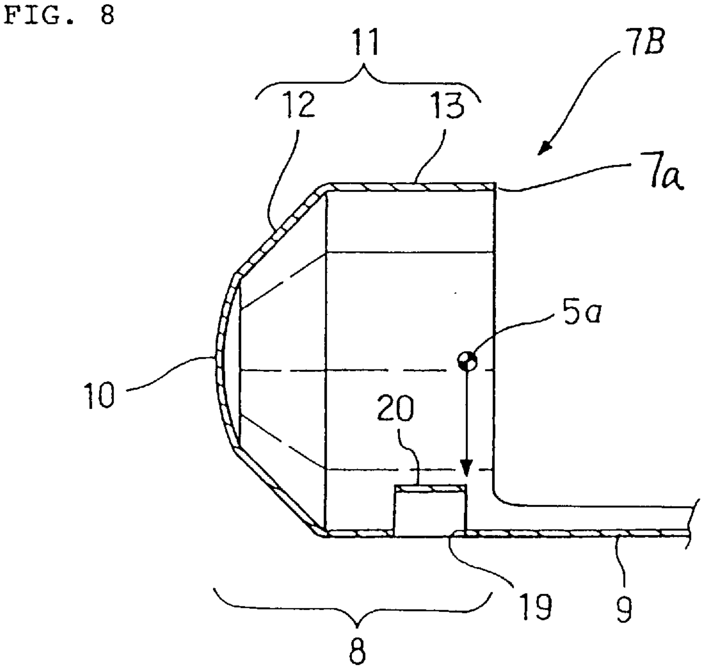
FIG. 8 is a longitudinally sectional side view thereof.

FIGS. 7 and 8 show a vehicle headlamp according to the third embodiment of the present invention Like the second embodiment, the third embodiment differs from the first embodiment only in the configurations of the radiation openings 14 and the shading portions 15. Therefore, the description will be made only with reference to the different elements; and other elements designated by the same reference numerals as those of the corresponding elements of the vehicle lamp of the first embodiment will be omitted.

In this third embodiment, one radiation opening 19 is formed in two surfaces (in the bottom left and bottom right side surfaces 13*d* and 13*e*) in the lower section of the cylindrical portion 13, and a protruding arc-shaped shading portion 20 is formed so as to bridge over the radiation opening 19. More specifically, the arc-shaped shading portion 20 is protruded inward of the shade 7B and positioned above the radiation opening 19 so that the right and left side edges of the shading portion 20 are formed continuously to the corresponding right and left side edges of the radiation opening 19. As a result, the radiation opening 19, which is fan-shaped when viewed in the direction of the axis of the cylindrical portion 13 of the shade 7B as seen from FIG. 7 and is defined by the front and rear end edges of the shading portion 20, allows the air to flow in and out of the shade 7B through the opening 19.

The rear end edge 20*a* of the shading portion 20 and the open rear end 7*a* of the shade 7B are located on substantially the same diametric plane of the main body 13 of the shade 7B. Likewise, the filament 5*a* of the light bulb 5 is positioned on the same plane as the open rear end 7*a* and the rear end edge 20*a* of the shading portion 20.

The shading portion 20 of the third embodiment improves the heat releasing effect and prevents the generation of glare light in the same manner as in the first embodiment. Since the shading portion 20 is integral with the cylindrical portion 13 of the shade 7B, the manufacturing cost can be minimized because it is a simple structure.

In the above embodiments, the radiation opening(s) is formed in the lower section of the shade. However, the radiation opening(s) can be formed in the upper section of the shade or in both upper and lower sections thereof.

As described above, according to the present invention, the shade of the vehicle headlamp is provided with a radiation opening(s) and a shading portion(s); and the shading portion(s) prevents the light ray emitted from the light source from radiating to the front side of the light source. Accordingly, the heat generated by the light source escapes through the radiation opening(s) and does not accumulate inside the shade. Also, since the shading portion(s) prevents the light ray emitted from the light source from radiating to the front of the light source, the temperature of the area around the light source is prevented from increasing. In addition, the glare light is eliminated since the light ray is prevented from radiating to the front of the light source.

Further, since the radiation opening(s) is formed in the lower section of the shade, even if the front lens is a clear lens, the radiation opening cannot be identified when the vehicle lamp is viewed from the front; and the radiation opening(s) does not impair the outer appearance of the lamp.

Furthermore, in the present invention, the shading portion(s) is formed integrally with the shade. Therefore, the shading portion(s) does not have to be produced separately from the shade, thus reducing the manufacturing cost.

In addition, the shading portion(s) can be formed by pushing out the cuts made in the shade. Thus, the manufacturing cost can be minimized because of the simple structure.

Further, the radiation opening(s) is formed in the side surface(s) of the shade, and the shading portion(s) protrudes inward of the shade, so that the side edges of the shading portion(s) are continuous to the corresponding side edges of the radiation opening(s). Accordingly, the radiation opening(s) and the shading portion(s) can be made in integral, and the manufacturing cost can be minimized.

Configurations and structures of the elements in the respective embodiments described above are explained as mere examples of applications of the present invention; and it should be clearly understood that the scope of claims for the present invention is not restricted to the foregoing description.

What is claimed is:

1. A vehicle lamp comprising a front lens, a light source and a shade for covering said light source, wherein said shade comprises:

a radiation opening formed in said shade; and a shading portion formed in said shade so as to prevent a light ray emitted from said light source from radiating through said radiation opening to a front of said light source.

2. A vehicle lamp according to claim 1, wherein said radiation opening is formed in a lower section of said shade.

3. A vehicle lamp according to claim 1 or 2, wherein said shading portion is formed integrally with said shade.

4. A vehicle lamp comprising a front lens, a light source and a shade for covering said light source, wherein said shade comprises:

a radiation opening formed in said shade; and a shading portion formed in said shade so as to prevent a light ray emitted from said light source from radiating through said radiation opening to a front of said light source; and wherein said shading portion is formed integrally with said; and said shading portion is formed by pushing out a cut made in a portion of said shade.

5. A vehicle lamp comprising a front lens, a light source and a shade for covering said light source, wherein said shade comprises:

a radiation opening formed in said shade; and a shading portion formed in said shade so as to prevent a light ray emitted from said light source from radiating through said radiation opening to a front of said light source; and wherein said shading portion is formed integrally with said shade;

said radiation opening is formed in a side surface of said shade;

said shading portion is formed so as to protrude inward of said shade from said radiation opening; and side edges of said radiation opening is continuous to corresponding side edges of said shading portion.

6. A vehicle lamp comprising a lamp body, a front lens installed on a front end of the lamp body a reflector provided inside the lamp body, a light source installed in the lamp body, and a shade provided in the lamp body so as to cover the light source, wherein said shade comprises:

a shade main body and a leg portion extending from one end of said shade main body for mounting said shade to said reflector, the shade main body comprising a front portion and a peripheral wall portion continuously formed into a single body, said peripheral wall portion being a polygonal cylinder;

a radiation opening opened in said peripheral wall portion so as to allow heat generated by said light source to be released through said radiation opening; and a shading portion formed in said peripheral wall portion so as to partially cover said radiation opening, thus preventing a light ray emitted from said light source from radiating through said radiation opening to a front of said light source.

* * * * *